United States Patent [19]

Schmelz

[11] Patent Number: 5,643,536

[45] Date of Patent: Jul. 1, 1997

[54] METHOD AND APPARATUS FOR METERING A REAGENT INTO A FLOWING MEDIUM

[75] Inventor: Helmut Schmelz, Prien, Germany

[73] Assignee: Siemens Aktiengesellschaft, Munich, Germany

[21] Appl. No.: 334,866

[22] Filed: Nov. 4, 1994

[30] Foreign Application Priority Data

Nov. 4, 1993 [DE] Germany ................... 43 37 664.9

[51] Int. Cl.$^6$ .................................................. G05B 1/01
[52] U.S. Cl. .................. 422/105; 422/83; 422/90; 422/98; 422/108; 422/110; 422/111; 422/62; 422/82.01; 422/82.02; 422/171; 422/176; 422/177; 436/55; 436/147; 436/149; 60/299; 324/71.1; 324/722; 324/446; 324/439; 324/450
[58] Field of Search ..................... 422/105, 108, 422/110, 111, 177, 62, 82.01, 82.02, 171, 176, 83, 90, 98; 436/55, 147, 149; 60/299; 324/71.1, 722, 446, 439, 450

[56] References Cited

U.S. PATENT DOCUMENTS

| | | | |
|---|---|---|---|
| 3,810,361 | 5/1974 | Weaving et al. | 60/288 |
| 3,813,226 | 5/1974 | Heitland et al. | 24/288 F |
| 4,113,838 | 9/1978 | Koike et al. | 423/235 |
| 4,160,009 | 7/1979 | Hamabe | 422/108 |
| 4,188,190 | 2/1980 | Muraki et al. | 436/55 |
| 4,188,364 | 2/1980 | Gladden | 423/213.2 |
| 4,251,496 | 2/1981 | Longo et al. | 423/239 A |
| 4,302,205 | 11/1981 | Muraki et al. | 422/62 |
| 4,314,345 | 2/1982 | Shiraishi et al. | 364/500 |
| 4,473,536 | 9/1984 | Carberg et al. | 423/239 |
| 4,473,537 | 9/1984 | Ford Jr. et al. | 422/62 |
| 4,565,679 | 1/1986 | Michalak et al. | 422/62 |
| 4,571,329 | 2/1986 | Kato et al. | 423/239 |
| 4,681,674 | 7/1987 | Graven et al. | 208/59 |
| 4,692,318 | 9/1987 | Tolpin et al. | 423/239 |
| 4,732,737 | 3/1988 | Agarwal | 422/111 |
| 4,751,054 | 6/1988 | Watanabe | 422/111 |
| 4,820,492 | 4/1989 | Wada et al. | 422/111 |
| 4,963,332 | 10/1990 | Brand et al. | 422/62 |
| 5,026,528 | 6/1991 | Gal | 422/111 |
| 5,047,220 | 9/1991 | Polcer | 422/62 |
| 5,116,579 | 5/1992 | Kobayashi et al. | 422/111 |
| 5,186,901 | 2/1993 | Bayer et al. | 422/111 |
| 5,314,828 | 5/1994 | Dalla Betta et al. | 436/118 |
| 5,326,536 | 7/1994 | Carter | 422/111 |
| 5,540,047 | 7/1996 | Dahlheim et al. | 60/274 |
| 5,546,004 | 8/1996 | Schmelz | 324/446 |

FOREIGN PATENT DOCUMENTS 0381236 8/1990 European Pat. Off. .
1411894 10/1975 United Kingdom .

OTHER PUBLICATIONS

Japanese Patent Abstract No. 51-145465 (Hisamatu) Dec. 14, 1976.

*Primary Examiner*—Jill Warden
*Assistant Examiner*—Sharidan Carrillo
*Attorney, Agent, or Firm*—Herbert L. Lerner; Laurence A. Greenberg

[57] ABSTRACT

A method for metering a reagent into a flowing medium includes adjusting a quantity of a reagent to be metered per unit of time into a flowing medium as a function of a thickness of a reaction zone in a catalytically active material. An apparatus for metering a reagent into a flowing medium includes a control unit, a device associated with the control unit for detecting a thickness of a reaction zone, and a metering device associated with the control unit for introducing a reagent into a flowing medium upstream of a catalytic converter as seen in flow direction of the medium. The control unit adjusts a quantity of the reagent to be metered into the flowing medium per unit of time by the metering device, as a function of a thickness of the reaction zone.

8 Claims, 3 Drawing Sheets

METHOD AND APPARATUS FOR METERING A REAGENT INTO A FLOWING MEDIUM

BACKGROUND OF THE INVENTION

FIELD OF THE INVENTION

The invention relates to a method and an apparatus for metering a reagent into a flowing medium, for instance for metering ammonia into a catalytic conversion of nitrogen oxides, contained in an exhaust or flue gas, using ammonia.

In the catalytic conversion of at least two reagents of a flow medium, if high degrees of settling and at the same time negligible leakage of the reagents are to be attained, then it is necessary to furnish the reagents to a catalytic converter in a suitable stoichiometric ratio to one another. In the case of the catalytic conversion of nitrogen oxides contained in an exhaust gas or flue gas by the method of selective catalytic reduction (SCR) with ammonia as the reducing agent, for instance, it is necessary for the nitrogen oxides and ammonia to be present in approximately equal portions, averaged over time, at the catalytic converter.

Adjusting the requisite stoichiometric ratio of nitrogen oxides to ammonia, or to some substance such as urea that can be converted into ammonia, can be performed with satisfaction only if the nitrogen oxide concentration in the exhaust or flue gas can be measured, or can be determined comparatively accurately through a performance graph diagnosis.

However, measuring the nitrogen oxide concentration requires comparatively major effort and entails comparatively great expense. For instance, such measurements can therefore be carried out only in large SCR systems in power plants, but once again a local leakage of ammonia caused by nitrogen oxide skewing can only be unsatisfactorily prevented. Yet avoiding leakage of ammonia must be sought under all circumstances, since ammonia is poisonous and in even extremely slight concentrations ammonia causes annoyance to the human being from its smell (odor threshold approximately 5 ppm).

Since the nitrogen oxide concentration in fossil-fueled power plant flue gases also only varies slowly, because of load changes that are only slowly completed over time, in power plants ammonia metering is carried out with the aid of measurements of nitrogen oxide and nitrogen oxide leakage, with relatively long time constants. Ammonia metering for flue gases with only slowly completed changes in nitrogen oxide concentration is thus achieved somewhat satisfactorily.

Removing nitrogen from flue gases emitted by Diesel engines and lean-running engines is significantly more difficult. Due to different operating states and rapid load changes in such engines, a system constructed for such engines, with a controlled Diesel catalytic converter (CDC), which likewise works by the SCR process with respect to nitrogen oxide reduction, must be constructed for the resultant major fluctuations in the volumetric flow of exhaust gas, exhaust gas temperature, and nitrogen oxide concentration in the exhaust gas. Since ammonia itself is hazardous and therefore cannot be carried in vehicles, such as passenger cars, trucks, buses, locomotives and ships, the requisite reducing agent is instead carried in the vehicle in the form of an aqueous urea solution, for instance, from which ammonia is then generated, ideally in precisely the quantity needed at the moment.

Since the use of currently known nitrogen oxide sensors in vehicles is extremely improbable because of the major effort and expense involved, the attempt has been made to ascertain the nitrogen oxides produced by the engine per unit of time by a performance graph comparison, adding metered quantities of a suitable reducing agent to these quantities of nitrogen oxide, thus called up from the graph or calculated, and simulating the settling capacity of the catalytic converter in an on-board diagnosis system (see German Published, Non-Prosecuted Application DE 43 15 278 A1, for instance). In a corresponding embodiment of the catalytic converter, in other words with a suitable catalyst adsorption and desorption characteristic, for instance as defined by German Published, Non-Prosecuted Application DE 43 09 891 A1, corresponding to co-pending U.S. application Ser. No. 08/218,358, filed Mar. 25, 1994, the adding of ammonia in metered fashion to the exhaust gases of Diesel and lean-running engines is solved to some satisfaction by means of changing the nitrogen oxide concentration in a way that is completed quickly.

However, it has been definitively found that in the metered addition of the reducing agent in an SCR or CDC system, there is thus far no suitable control capability, and as a result if there is a defect, for instance in the catalytic converter or at the metering valve, annoyance can be created by excessive leakage of ammonia.

SUMMARY OF THE INVENTION

It is accordingly an object of the invention to provide a method and an apparatus for metering a reagent, such as ammonia, into a flowing medium, which overcomes the hereinafore-mentioned disadvantages of the heretofore-known methods and devices of this general type and with which it is possible to adjust a concentration of the reagent, such as ammonia, to at least one further reagent contained in the flowing medium, such as nitrogen oxides, in an advantageous ratio relative to one another, for the sake of the catalytic conversion of the reagent.

With the foregoing and other objects in view there is provided, in accordance with the invention, a method for metering a reagent into a flowing medium, which comprises adjusting a quantity of a reagent to be added in metered fashion per unit of time into a flowing medium as a function of a thickness of a reaction zone in a catalytically active material.

In this case, once adsorption has taken place at the catalytically active material, the reagent is converted together with at least one further reagent in the flowing medium. The thickness of the reaction zone is defined as the depth in the catalytically active material at which the course of concentration of the reagent adsorbed at the catalytically active material passes through a local minimum.

With the objects of the invention in view, there is also provided an apparatus for metering a reagent into a flowing medium, comprising a control unit; means associated with the control unit for detecting a thickness of a reaction zone; and a metering device associated with the control unit for introducing a reagent into a flowing medium upstream of a catalytic converter as seen in flow direction of the medium; the control unit adjusting a quantity of the reagent to be added in metered fashion into the flowing medium per unit of time by the metering device, as a function of a thickness of the reaction zone.

As a result, by observing the thickness of the reaction zone and particularly the deviations over time from a command or set-point value for the thickness, a timely and detailed statement can be made as to the concentration ratios of the reagents involved in the catalytic conversion in the flowing medium. As a consequence, the concentration of reagents relative to one another can be adjusted in this way in a stoichiometric ratio that is advantageous for the catalytic conversion. This has an extremely advantageously effect on the attainable degrees of precipitation of the reagents in the catalytic conversion. Moreover, an opportunity is created for monitoring the dynamics of the catalytic conversion. As a result, in the catalytic conversion of nitrogen oxides with ammonia that is metered into the flowing medium, errors in the previously usual calculation of the quantity of ammonia to be metered, or defects in the metering device, are noticed early, for instance, which contributes to quality assurance (high degrees of precipitation) and particularly to avoiding a leakage of ammonia or exhaustion of the catalytic converter.

In accordance with another mode of the invention, there is provided a method in which upstream of the catalytically active material in terms of the direction of flow of the medium, the concentration of the reagent in the flowing medium is raised or lowered if the thickness of the reaction zone increases or decreases, respectively, in particular with respect to a command or set-point value for the thickness. This process permits a desired, largely stoichiometric adjustment of the reagents in the flowing medium. If one reagent is present in excess with respect to the concentration of the other reagent in the flowing medium, for instance, then this is expressed by an increasing adsorption of this reagent on the catalytically active material. This results in a decrease in the thickness of the reaction zone and therefore an increasingly lesser penetration of the other reagent into the catalytically active material, so that the catalytic converter is increasingly operated in the direction of an operating state known as "overflowing". In the event of a reaction zone that disappears entirely, the adsorption capability of the catalytically active material for the reagents that are present in excess is exhausted, and therefore leakage of this excess reagent is unavoidable. On the other hand, a substoichiometric metering of the first reagent leads to an increase in the thickness of the reaction zone and therefore to leakage of the other reagent involved in the catalytic conversion. However, a brief substoichiometric or superstoichiometric metering of the reagents can moreover also be established and monitored, in the event that that should be advantageous for the catalytic conversion of the reagents.

In accordance with another feature of the invention, in order to permit exhausting the adsorption capability of the catalytically active material advantageously, for the sake of avoiding leakage of one of the two reagents, the means for detecting the thickness of the reaction zone are disposed within an interval of 30 to 90%, and preferably 50 to 70%, with respect to the length of the catalytic converter. Thus on one hand, on the catalytically active material of the catalytic converter, an excess of the reagent can still be stored up adequately far upstream of the end of the catalytic converter, and then an oversupply with the reagent can be intercepted in good time, and on the other hand, if the reagent required for the catalytic conversion is metered in an overly slight quantity, this reagent, for catalytic conversion, in its forms adsorbed on the catalytically active material, can still be removed from the catalytic converter in good time.

In accordance with a further, alternative feature of the invention, the means for detecting the thickness of the reaction zone are disposed at the inlet of the flowing medium, or at the inlet of a portion of the medium, into the catalytic converter and at its outlet. In this way, by a comparison of the thickness of the reaction zone in the means disposed at the inlet and at the outlet, the course of catalytic conversion in the catalytic converter can be interpolated.

In accordance with a further mode of the invention, there is provided a method in which a material in which the thickness of the reaction zone is detected is kept at a temperature of 250° to 550° C., in order to employ the method in the catalytic conversion of nitrogen oxides using ammonia. Catalytic converters for the catalytic conversion of nitrogen oxides with ammonia are typically operated in this temperature range, and therefore the characteristic with respect to the adsorption of nitrogen oxides and ammonia of the material in which the thickness of the reaction zone is detected, if this material is not already catalytically active material itself, can be adapted simply to the characteristic of the catalytically active material.

In accordance with an added feature of the invention, the means for detecting the thickness of the reaction zone are heatable.

In accordance with a concomitant feature of the invention, there are provided means for temperature-stabilization of the flowing medium.

Other features which are considered as characteristic for the invention are set forth in the appended claims.

Although the invention is illustrated and described herein as embodied in a method and an apparatus for metering a reagent into a flowing medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF TE PREFERRED EMBODIMENTS

Figure 1:
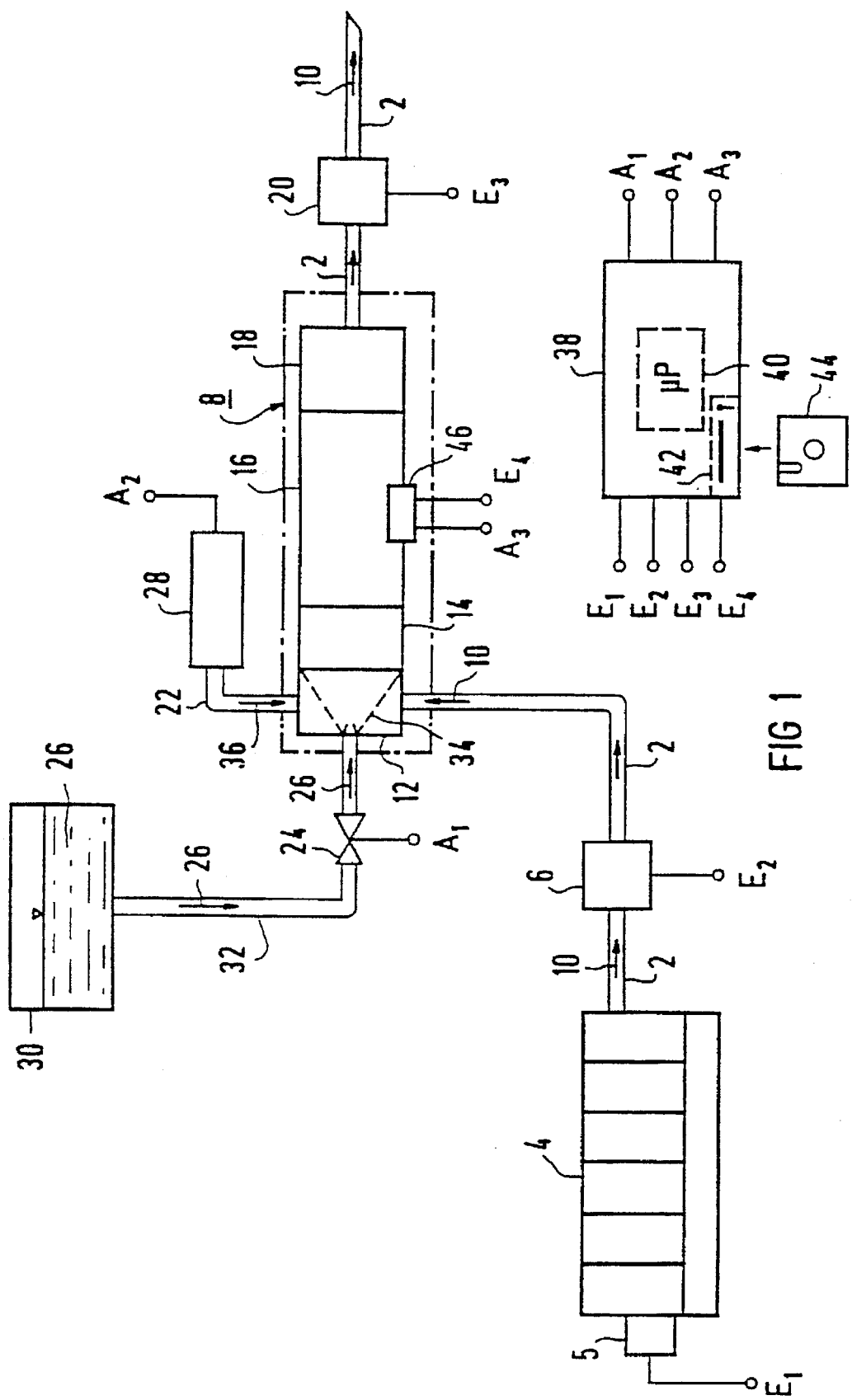
FIG. 1 is a diagrammatic, schematic and block circuit diagram of an exhaust line of a 300 kW Diesel engine, with charge air cooling with metering of a reagent into an exhaust gas that contains nitrogen oxide, according to the invention.

Referring now to the figures of the drawing in detail and first, particularly, to FIG. 1 thereof, there is seen an exhaust gas line 2 of a 300 kW Diesel engine 4 charge air, with charge air cooling with a measurement point or location 5 connected to the Diesel engine 4. A measuring point or location 6, a catalytic converter 8 and a further measuring point or location 20 are incorporated into the exhaust line 2 in that order. In terms of a flow direction of an exhaust gas 10, the catalytic converter 8 includes an inlet chamber 12, a hydrolysis catalytic converter 14, a deNO$_x$ catalytic converter 16, and an oxidation catalytic converter 18, in that order. Besides the exhaust line 2, a blue burner exhaust line 22 and an adjustable injection valve 24 for a reducing agent 26 are also connected to the inlet chamber 12. Hot exhaust gas 36 of a blue burner 28 is introduced as needed into the inlet chamber 12 through the blue burner exhaust line 22. The reducing agent 26, which is an aqueous urea solution in the exemplary embodiment, is kept on hand in a reducing agent tank 30. The reducing agent is delivered to the injection valve 24 through a reducing agent supply line 32. Through the use of the injection valve 24, the reducing agent 26 is injected into the inlet chamber 12, inside a zone that is kept away from the walls of the inlet chamber 12 by perforated plates 34. The exhaust gas 10 and optionally the blue burner exhaust gas 36 enter the inlet chamber 12 outside that zone, they are passed through the holes in the perforated plates 34, and in so doing entrain the reducing agent 26 that was injected into the inlet chamber 12. This prevents the reducing agent 26 from disadvantageously being deposited on the walls of the inlet chamber 12.

In order to adjust the quantity of reducing agent to be metered per unit of time into the exhaust gas 10, a control unit 38 with a microprocessor subunit 40 is provided. Through inputs E1–E4, the control unit 38 detects operationally relevant parameters, the knowledge of which is required for suitable adjustment of the quantity of reducing agent to be metered per unit of time. Through the use of the measuring location 5, which includes a number of sensors, the air flow rate, the governor rod travel (gas pedal position), the charge pressure, and the rpm of the engine 4 are detected. These data are present at the input E1. The operationally relevant parameters of the exhaust gas 10, in this case its temperature, pressure and flow rate, which are measured at the measuring location 6, are present at the input E2. In the exemplary embodiment, the flow rate and pressure of the exhaust gas 10 are calculated from the operationally relevant parameters of the engine 4 that are available at the input E1. It would also be possible to measure the pressure and the flow rate as well by way of separate sensors in the measuring location 6. The temperature of the exhaust gas 10, measured downstream of the catalytic converter 8 by means of 5 the further measuring location 20, is present at the input E3. Data measured by a sensor 46 for determining the temperature of the sensor 46 and for determining the thickness of a reaction zone in the sensor material of the sensor 46 are present at the input E4.

The sensor 46 includes a plurality of non-illustrated pairs of contacts, upon which a direct voltage, or a direct voltage of periodically reversed polarity, or an alternating voltage, can be imposed through an output A3 of the control unit 38. In this way, the depth course of the ammonia adsorbed at the sensor material can be determined by measuring partial specific conductivities of the sensor material.

Such operationally relevant parameters of the catalytic converter 8 as the course of pressure and temperature of the catalytic activity, the pressure-dependent and temperature-dependent specific storage capacity for the reducing agent 26, and such physical variables as the weight of the catalytically active mass, geometry and heat transfer, can be stored in memory, for instance on an accompanying diskette 44 for the catalytic converter 8. These parameters can be loaded into the microprocessor subunit 40 by means of a disk drive 42 that is built into the control unit 38.

The injection valve 24 for the reducing agent 26 is adjusted through an output A1 of the control unit 38. The adjustment of the quantity of reducing agent to be metered into the exhaust gas 10 per unit of time by means of the injection valve 24 is performed with a largely stoichiometric ratio of nitrogen oxides to ammonia, as will be described in further detail below. The blue burner 28 can be turned on and off as needed through an output A2 of the control unit 38.

When the Diesel engine 4 is started, the nitrogen oxide content in the exhaust gas 10 is determined by means of the control unit 38, by detection of the parameters at the input E1 that have been measured by means of the measuring location 5. Through the use of the measurement of the temperature of the exhaust gas 10 of the measuring locations 6, 20, the temperature of the catalytic converter 8 is determined by means of the control unit 38. By turning the blue burner 28 on as needed, and in particular shortly after the startup of the Diesel engine 4, the catalytic converter 8 is rapidly adjusted to a temperature that is advantageous for catalytic conversion of the nitrogen oxides with ammonia. The reducing agent 26 is injected into the exhaust gas 10 in accordance with the ascertained nitrogen oxide content. The aqueous urea solution used in this case hydrolyzes into ammonia and water in the hydrolysis catalytic converter 14, which is likewise temperature-stabilized with the blue burner exhaust gas 36. Once the hydrolysis has been performed, the concentrations of nitrogen oxide and of ammonia are adjusted to be virtually identical. Ammonia is absorbed at the catalytically active material of the deNO$_x$ catalytic converter 16. When one nitrogen oxide molecule and one ammonia molecule meet at a catalytically active center, the nitrogen oxide and ammonia molecules are together converted to make nitrogen and water.

Since the concentration of nitrogen oxide and ammonia in the exhaust gas 10 is adjusted to be virtually equal in the deNO$_x$ catalytic converter 16, and since there is an only approximately 90% conversion achieved by the deNO$_x$ catalytic converter 16, approximately 10% of the quantity of ammonia previously introduced into the exhaust gas 10 is adsorbed at the catalytically active material of the catalytic converter 16 and at the sensor material of the sensor. These stored molecules penetrate to the depth of the catalytically active material and the sensor material, because the reaction of nitrogen oxides and ammonia takes place in the layers near the surface of the catalytically active material. In this way, in the direction of an increasing material depth both in the sensor material and in the catalytically active material, the result is a course of concentration of the adsorbed ammonia that initially, from a relatively high concentration in the gas phase at the surface of the material, drops to a local minimum as a consequence of the reaction, and then rises quickly to a saturation value. In this way, it is possible with the sensor 46 to detect this course and in particular the change over time of the thickness of a reaction zone. The thickness of the reaction zone is defined as the depth of material at which the concentration of the ammonia adsorbed at the sensor material passes through a local minimum. Even shortly after the Diesel engine 4 has been started, the signals of the sensors 46 are employed to the adjust the quantity of reducing agent to be introduced per unit of time into the exhaust gas 10.

Figure 5:
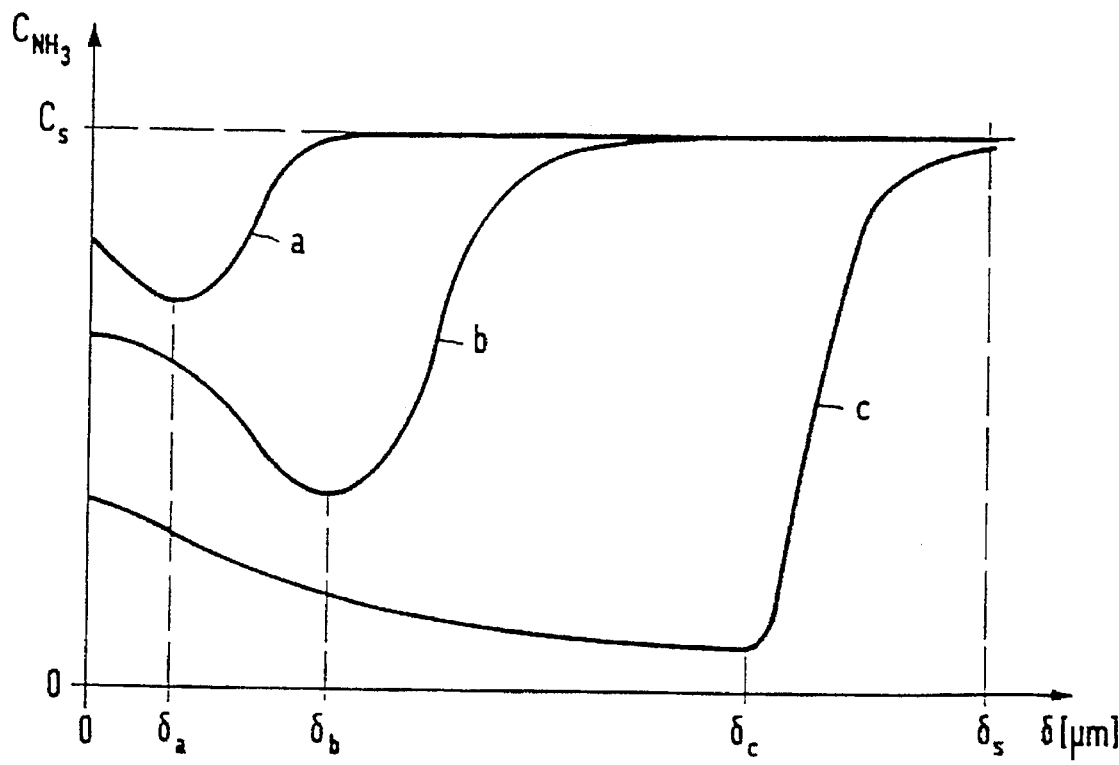
FIG. 5 is a diagram showing a qualitative course of a concentration of ammonia adsorbed on catalyst material as a function of a depth of material, for various concentrations of ammonia and nitrogen oxide in the exhaust gas.

Turning now to FIG. 5, there are seen three typical courses a–c for the concentration of the ammonia adsorbed at the catalytically active material. Curve a shows a course that results when the concentration of the metered ammonia for a relatively long period of time exceeds the concentration of the nitrogen oxides contained in the exhaust gas 10. The catalytically active material stores up ammonia at its depth, up to a pressure-sensitive and temperature-sensitive saturation value $C_s$. The thickness of the reaction zone is a value $\delta_a$, which is relatively close to the surface of the catalytically active material. If this operating state were maintained for a short period of time, then the adsorption capability of the catalytically active material for ammonia would be exhausted. The ammonia would escape from the catalytic converter 8 in the form of extremely undesirable leakage. In this operating state, large quantities of ammonia would also be liberated very suddenly if the temperature of the exhaust gas 10 were to rise sharply, which is associated with a decrease in the specific storage capacity of the catalytically active material for ammonia with increasing temperature. In such a situation, through the use of the data of the sensor 46 present at the input E4, the control unit 38 therefore decreases the quantity of ammonia introduced into the exhaust gas per unit of time.

In this way, the ammonia stored on the catalytically active material in the layers disposed on the surface is re-used for catalytic conversion of the nitrogen oxides, and a course represented by curve b is established. In this case, the thickness $\delta_b$ of the reaction zone is approximately one-third the layer thickness $\delta_s$ of the sensor material. This operating state is especially flexible with respect to briefly sharply rising or dropping nitrogen oxide concentrations, because in the case of sharply rising nitrogen oxide concentrations, sufficient ammonia is stored on the catalytically active material, and in the case of sharply decreasing nitrogen oxide concentrations, a sufficiently high storage capacity of the catalytically active material for excess ammonia is temporarily present. The operating state represented by course b is accordingly distinguished by a maximum possible degree of conversion for nitrogen oxides, with negligible ammonia leakage, and is therefore either established or sought by means of the control unit 38 when the Diesel engine 4 is in operation.

The value $\delta_b$ for the thickness of the reaction zone therefore serves the control unit 38 as a command or set-point value to which the actual thickness of the reaction zone present on the catalytically active material is adjusted. Curve course c which has not yet been discussed represents the case of a longer-lasting overly slight metering of ammonia into the exhaust gas 10. The nitrogen oxides adsorbed on the catalytically active material must penetrate relatively deeply into the catalytically active material in order to find any reaction partner at all. The thickness $\delta_c$ of the reaction zone therefore tends in the direction of the material thickness $\delta_s$. In this operating state, high nitrogen oxide leakage is unavoidable. The control unit 38 in this case drastically but briefly raises the quantities of reducing agent metered into the exhaust 10 per unit of time, in order to make the course of concentration of the ammonia adsorbed at the catalytically active material once again virtually coincide with the course b.

Figure 2:
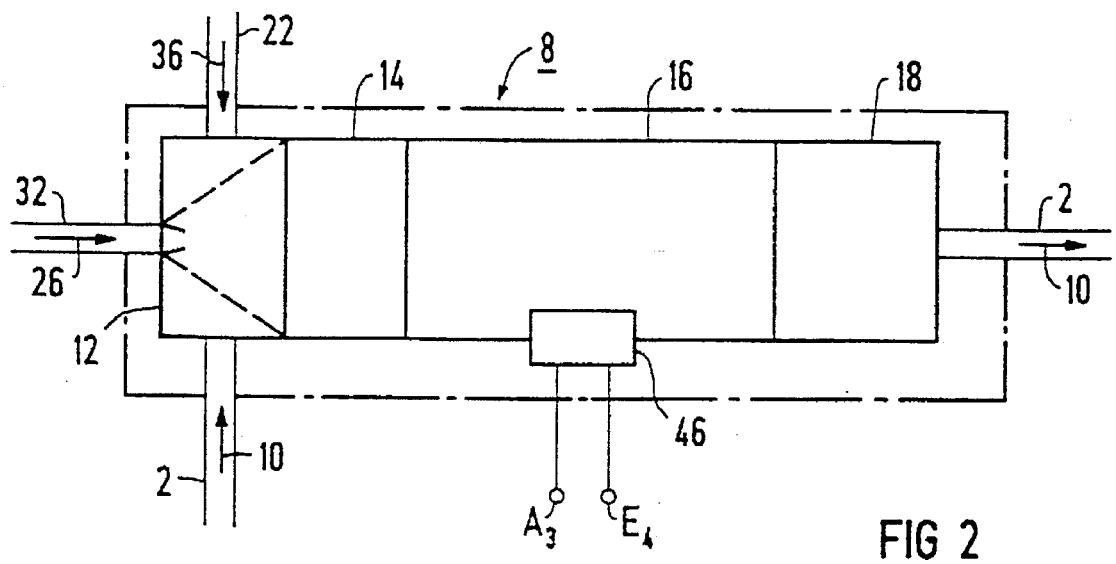
FIG. 2 is an enlarged view of a catalytic converter shown in FIG. 1.

FIG. 2 again shows the catalytic converter 8, which is enlarged as compared to FIG. 1. This figure clearly shows that the sensor 46 for detecting the thickness of the reaction zone is disposed after approximately 50% of the deNO$_x$ catalytic converter 16, with respect to the length of the deNO$_x$ catalytic converter 16. In the embodiment of FIG. 2, it is advantageous if the sensor is disposed at an interval of between 30 and 90% and preferably 50 to 70%, and in the case shown approximately 50%, with respect to the length of the deNO$_x$ catalytic converter 16. In this way, there is still enough catalytically active material downstream of the sensor 46, in terms of the flow direction of the exhaust gas 10, for storing excess ammonia 10 on one hand and for catalytically converting nitrogen oxides contained in the exhaust gas 10 using the ammonia, on the other hand. Like the catalytically active material of the deNO$_x$ catalytic converter 16, the sensor material of the sensor 46 includes suitable deNO$_x$ material, such as titanium dioxide and one or more of the components in the group of tungsten oxide, molybdenum oxide, vanadium oxide, and $V_xMO_yO_{32-z}$, where $x+y \leq 12$, $x$, $y \geq 1$ and $z \leq 1$. Thus the adsorption characteristic of the sensor material is equivalent to that of the catalytically active material, so that adaptation of different adsorption characteristics of the sensor material and catalytically active material in the control unit 38 becomes unnecessary. The data likewise present at the input E4 for determining the temperature of the sensor 46 are utilized to adjust the temperature of the sensor 46, which is heatable, through resistance heating. The temperature of the sensor 46 is adjusted within a temperature range from 250° to 550° C. Within this temperature range, the catalytically active material of the deNO$_x$ catalytic converter 16 also functions advantageously.

Figure 3:
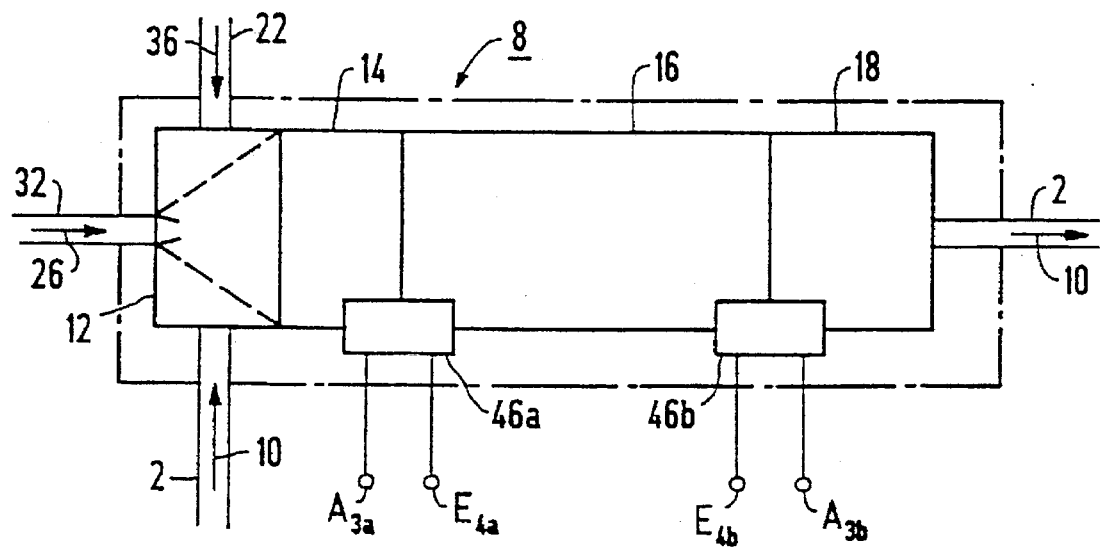
FIG. 3 is a view of a catalytic converter being modified slightly as compared to FIG. 2.

An alternative variant shown in FIG. 3, which is only slightly modified as compared to FIG. 2, provides a configuration of sensors 46a, 46b directly at the respective beginning and end of the deNO$_x$ catalytic converter 16. The former input E4 is split into inputs E4a and E4b, and the former output A3 is split into outputs A3a and A3b. Through the use of the data of the sensors 46a and 46b respectively measured at the inlet and outlet of the deNO$_x$ catalytic converter 16, the course of the thickness of the reaction zone can be interpolated from the length of the deNO$_x$ catalytic converter 16. Once again, it is advantageous if the thickness of the reaction zone is adjusted to approximately the value $\delta_b$ in FIG. 5, on the precondition that the layer thickness of the catalytically active material remains constant over the length of the deNO$_x$ catalytic converter 16, or even increases in the flow direction of the exhaust gas 10.

Figure 4:
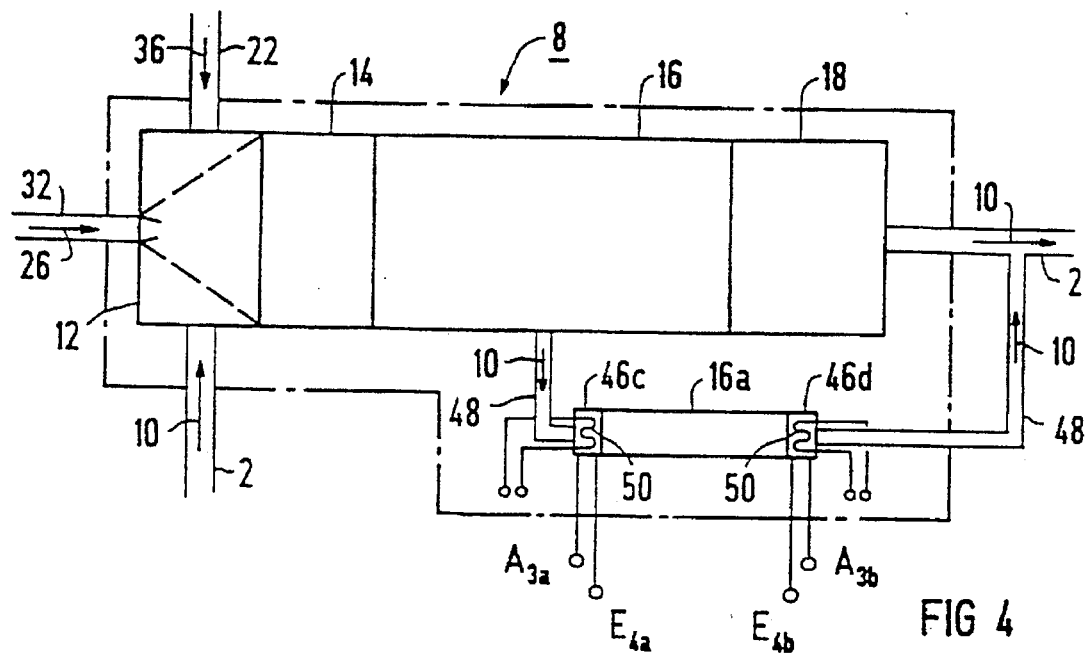
FIG. 4 is another view of a catalytic converter being modified slightly as compared to FIGS. 2 and 3 and having a bypass segment.

Another advantageous feature in terms of a configuration of sensors 46c, 46d can be seen in FIG. 4. A small portion of the exhaust gas 10 is diverted into a bypass conduit 48 approximately halfway along the length of the deNO$_x$ catalytic converter 16. This exhaust gas is carried through the sensors 46c, 46d with an intervening deNO$_x$ catalytic converter 16a and is introduced back into the exhaust gas line 2 downstream of the oxidation catalytic converter 18, in terms of the flow direction of the exhaust gas 10. The catalytically active material located in the deNO$_x$ catalytic convert 16a is the same as the catalytically active material of the deNO$_x$ catalytic converter 16. In this way, for instance, it is possible to temperature-stabilize the sensors 46c and 46d to defined temperatures, for instance approximately 400° C., in the bypass conduit 48. As a result, the course of the change over time of the thickness of the reaction zone is tracked as representing a fixed temperature. In the control unit 38, the metering of the reducing agent 26 is then performed in adaptation to the actual present temperature of the deNO$_x$ catalytic converter 16 and the resultant specific storage capacity of the catalytically active material. In order to provide temperature stabilization of the sensors 46c, 46d, the sensors may, for instance, be provided with an electrical resistance heater 50 disposed in meandering fashion. The temperature of the sensors in general can be measured with NiCr/Ni thermocouples or Pt100 resistor elements, for instance. In order to keep the temperature virtually constant at the sensors 46c and 46d, means for temperature stabilization of the flowing medium may additionally be provided, for instance in the bypass conduit 48.

I claim:

1. An apparatus for metering an ammonia reagent into a flowing medium and for reacting the ammonia reagent with an agent contained in the medium to produce a catalytic conversion of said agent, comprising:

a) a catalytic converter through which a medium is passed, said catalytic converter including a first catalytically active material in which an agent is reacted with the ammonia reagent to produce a catalytic conversion of said agent;

b) a metering device for metering the ammonia reagent into the flowing medium upstream of said catalytic converter;

c) a control unit comprising:
  i) a sensor means for detecting the electrical conductivity within said first catalytically active material having the ammonia adsorbed therein;
  ii) a means for calculating the thickness of the reaction zone from the electrical conductivity measured by said sensor means, the thickness of the reaction zone being defined as a depth at which the ammonia is adsorbed in said catalytically active material; and
  iii) a means for controlling said metering device to adjust the quantity of ammonia to be metered into the flowing medium per unit time in response to said calculated thickness of the reaction zone.

2. The apparatus according to claim 1, wherein said means for detecting the thickness of the reaction zone are disposed within an interval of from 30 to 90% relative to a length of said catalytic converter.

3. The apparatus according to claim 1, wherein said means for detecting the thickness of the reaction zone are disposed within an interval of from 50 to 70% relative to a length of said catalytic converter.

4. The apparatus according to claim 1, wherein said means for detecting the thickness of the reaction zone are disposed at an inlet and at an outlet of said catalytic converter.

5. The apparatus according to claim 1, wherein said means for detecting the thickness of the reaction zone are heatable.

6. The apparatus according to claim 1, including means for temperature-stabilization of the flowing medium.

7. The apparatus according to claim 1, comprising:
  an intervening catalytic converter comprising a second catalytically active material wherein the ammonia is reacted with the agent;
  a bypass conduit for diverting a portion of the medium from within said catalytic converter, passing the portion through said intervening catalytic converter and introducing the portion into the medium downstream of said catalytic converter; wherein
  said means for detecting the thickness are disposed at an inlet and at an outlet of said intervening catalytic converter.

8. The apparatus according to claim 7, wherein said bypass conduit is connected to said catalytic converter halfway along a length of said catalytic converter.

* * * * *